United States Patent [19]

Eichenauer et al.

[11] Patent Number: 5,274,032
[45] Date of Patent: Dec. 28, 1993

[54] POLYMER ALLOYS

[75] Inventors: Herbert Eichenauer, Dormagen; Alfred Pischtschan, Kuerten; Christian Lindner, Cologne, all of Fed. Rep. of Germany

[73] Assignee: Bayer AG, Leverkusen, Fed. Rep. of Germany

[21] Appl. No.: 435,058

[22] Filed: Nov. 13, 1989

[30] Foreign Application Priority Data

Nov. 24, 1988 [DE] Fed. Rep. of Germany ....... 3839584

[51] Int. Cl.$^5$ .................... C08L 51/04; C08L 51/06; C08L 51/08
[52] U.S. Cl. ...................................... 525/64; 525/71
[58] Field of Search ............... 525/63, 64, 71, 69

[56]  References Cited

U.S. PATENT DOCUMENTS

| | | | |
|---|---|---|---|
| 4,042,548 | 8/1977 | Abe et al. | 260/23 |
| 4,652,614 | 3/1987 | Eichenauer et al. | 525/71 |
| 4,806,593 | 2/1989 | Kress et al. | 525/63 |
| 4,916,186 | 4/1990 | Burk et al. | 525/71 |

FOREIGN PATENT DOCUMENTS

| | | |
|---|---|---|
| 0154244 | 9/1985 | European Pat. Off. |
| 0220160 | 4/1987 | European Pat. Off. |
| 0249964 | 12/1987 | European Pat. Off. |
| 0260552 | 3/1988 | European Pat. Off. |
| 2547508 | 4/1976 | Fed. Rep. of Germany |

OTHER PUBLICATIONS

Derwent Abstract of J47030751, "Thermoplastic Resin Compsn-Of Good Impact Resistance and Weather Resistance".

*Primary Examiner*—Ralph H. Dean
*Attorney, Agent, or Firm*—Connolly and Hutz

[57] ABSTRACT

Moulding compositions comprising
A) from 5 to 95% by weight of a graft product of a mixture of from 50 to 100 parts by weight of styrene, α-methylstyrene, vinyl toluene, methyl methacrylate or mixtures thereof and from 0 to 50 parts by weight of acrylonitrile on a particulate silicone rubber having an average particle diameter ($d_{50}$) of from 0.10 to 0.50 μm with a total rubber content of from 30 to 90% by weight and
B) from 95 to 5% by weight of a graft product of a mixture of from 50 to 100 parts by weight of styrene, α-methylstyrene, vinyl toluene, methyl methacrylate or mixtures thereof and from 0 to 50 parts by weight of acrylonitrile on a particulate EPDM rubber having an average particle diameter ($d_{50}$) of from 0.20 to 1.00 μm with a total rubber content of from 10 to 50% by weight.

3 Claims, No Drawings

POLYMER ALLOYS

This invention relates to polymer alloys which have good resistance to weathering and ageing and good processibility and are very tough at low temperatures.

Polymers with good resistance to ageing are known, e.g. graft polymers based on cross-linked acrylate rubbers in combination with a thermoplastic resin, so-called ASA polymer systems (see e.g. DE-AS 1 260 135, DE-OS 1 911 882, DE-OS 2 826 925 and EP-A 71 098) and graft polymers based on ethylene/propylene/-diene rubbers (EPDM rubbers) in combination with a thermoplastic resin, so-called AES polymer systems (see e.g. DE-OS 2 830 232, DE-OS 3 001 766, EP-A 121 327 and EP-A 134 154).

Although both ASA and AES systems are sufficiently tough at room temperature, their toughness rapidly decreases with decreasing temperature so that at temperatures from about 0° C. to −40° C. they are subject to brittleness fracture.

It has been found that thermoplastic polymer alloys with excellent weathering resistance combined with great toughness at low temperatures are obtained when AES systems in which the rubber phase has a particular particle size are combined with graft products based on silicone rubber of a particular particle size. The polymer alloys thus obtained are also distinguished by improved thermoplastic processibility.

The present invention relates to thermoplastic moulding compounds of

A) from 5 to 95% by weight, preferably from 20 to 80% by weight, of a graft product of a mixture of from 50 to 100 parts by weight, preferably from 60 to 95 parts by weight, of styrene, o-methylstyrene, vinyl toluene, preferably p-methylstyrene, methyl methacrylate or mixtures thereof of and from 0 to 50 parts by weight, preferably from 5 to 40 parts by weight, of acrylonitrile on a particulate silicone rubber having an average particle diameter ($d_{50}$) of from 0.10 to 0.50 μm, preferably from 0.10 to 0.15 μm, or from 0.25 to 0.50 μm, with a total rubber content of from 30 to 90% by weight, preferably from 40 to 80% by weight, and B) from 95 to 5% by weight, preferably from 80 to 20% by weight, of a graft product of a mixture of from 50 to 100 parts by weight of styrene, α-methylstyrene, vinyl toluene, preferably p-methylstyrene, methyl methacrylate or mixtures thereof and from 0 to 50 parts by weight, preferably from 5 to 40 parts by weight, of acrylonitrile, on a particulate EPDM rubber having an average particle diameter ($d_{50}$) of from 0.20 to 1.00 μm, preferably from 0.25 to 0.40 μm or from 0.35 to 0.60 μm, with a total rubber content of from 10 to 50% by weight, preferably from 10 to 40% by weight.

The graft products based on silicone rubber (A) suitable for the production of the moulding compounds according to the invention are obtained by radical polymerisation of vinyl monomers or vinyl monomer mixtures in the presence of silicone rubber, in particular in the presence of a silicone rubber in the form of an emulsion, at least part of the monomers being grafted on the rubber. Examples of suitable vinyl monomers include styrene, styrenes substituted in the nucleus or side chain, in particular p-methylstyrene and α-methylstyrene, halogenated styrenes, e.g. chloro- or bromo-styrene, vinyl naphthalene, derivatives of α,β-unsaturated mono- or dicarboxylic acids, in particular $C_1$–$C_5$-alkyl esters of acrylic or methacrylic acid, preferably methyl methacrylate, and the nitriles of acrylic acid or methacrylic acid, maleic acid anhydride, N-phenylmaleimide or mixtures thereof.

A preferred monomer mixture is a combination of styrene and/or α-methylstyrene and acrylonitrile, preferably in proportions by weight of (α-methyl)styrene:acrylonitrile of from 1:1 to 10:1.

Suitable silicone rubbers are, for example, the compounds described in DE-OS 3 629 763, which constitute mainly chemically linked siloxan groups of the general formulae $R_2SiO$, $RSiO_{3/2}$, $R_2R^3SiO_{1/2}$, $SiO_{4/2}$, $R^1CH{=}CH{-}(R^2)$ and H—S wherein R stands for a monovalent, saturated hydrocarbon group, in particular $CH_3$, phenyl or $C_2H_5$, optionally substituted by SH, halogen or $C_1$–$C_6$–oxyalkyl; $R^1$=H, $C_1$–$C_6$-alkyl, in particular H, $CH_3$; $R^2$=a single bond, $C_1$–$C_4$-alkylene, in particular $CH_2$ or $C_2H_4$, or a single bond; and $R^3$=R or OH. In these compounds 0 to 0.5 mols of $R_2R^3SiO_{\frac{1}{2}}$ units, 0 to 10 mols of $RSiO_{3/2}$ units and 0 to 3 mols of $SiO_{4/2}$ units to 100 mols of $R_2SiO$ units are preferred.

Other suitable silicone rubbers include core/shell materials such as particulate silicone rubbers which are covered by a shell of cross-linked acrylate rubber (see DE-OS 3 617 267) or particulate silicone rubbers contanining a core of cross-linked acrylate rubber (see DE-OS 3 720 475) or a core of styrene/acrylonitrile copolymer (see DE-OS 3 720 476). The graft products based on silicone rubbers are preferably made by emulsion polymerisation in which at least partially cross-linked silicone rubbers in emulsion form are used as graft bases.

Such graft polymerisations are known and are preferably carried out at temperatures from 30° C. to 100° C., using radical initiators such as organic or inorganic peroxides, inorganic persulphates, e.g. potassium persulphate, azo initiators such as azo-bis-isobutyronitrile and redox systems consisting of an oxidizing agent, preferably a peroxide, and a reducing agent, optionally with the addition of an aqueous emulsifier solution (e.g. anionic or non-ionic emulsifier components, preferably sodium, potassium or ammonium salts of long chain carboxylic acids containing from 10 to 20 carbon atoms; e.g. potassium oleate, alkyl sulphates containing 10 to 20 carbon atoms, alkyl sulphonates containing 10 to 20 carbon atoms or alkali metal or ammonium salts of disproportionated abietic acid). The reaction may be carried out batchwise, semi-batchwise, or continuously or by any other method, e.g. by continuous monomer additions.

The graft products may be prepared not only by emulsion polymerisation but also by suspension, solution or solvent-free polymerisation or combinations of these methods in known manner.

The graft products based on silicone rubbers (A) have a rubber content of from 30 to 90% by weight, preferably from 40 to 80% by weight. The average particle diameters ($d_{50}$) of the silicone rubbers are from 0.10 to 0.50 μm, preferably from 0.10 to 0.15 μm and from 0.25 to 0.50 μm.

The graft products based on EPDM rubber (B) used for the production of the moulding compounds according to the invention are obtained by the radical polymerisation of vinyl monomers or vinyl monomer mixtures in the presence of EPDM rubber, at least part of the monomers being grafted on the rubber. Examples of suitable vinyl monomers include styrene, α-methylstyrene, styrenes substituted in the nucleus such as p-methylstyrene, $C_1$-$C_5$-alkyl esters of acrylic acid or methacrylic acid, preferably methyl methacrylate, maleic acid anhydride, N-phenylmaleimide or mixtures thereof.

A preferred monomer mixture is a combination of styrene and/or a α-methylstyrene and acrylonitrile, preferably in ratios by weight of (α-methyl)styrene:acrylonitrile=1:1 to 10:1.

Examples of suitable EPDM rubbers include polymers of ethylene and propylene containing small quantities of a non-conjugated diene, e.g. dicyclopentadiene, ethylidene norbornene, 1,4-hexadiene, 1,4-cycloheptadiene or 1,5-cyclooctadiene.

The preparation of such graft products is known and may be carried out in suspension or solution (see e.g. Examples in EP-OS 227 855) or in emulsion (see EP-OS 264 721).

The graft products based on EPDM rubbers have a rubber content of from 10 to 50% by weight, preferably from 10 to 40% by weight.

The average particle diameters ($d_{50}$-values) of the polymers are from 0.20 to 1.00 μm, preferably from 0.25 to 0.40 μm or from 0.35 to 0.60 μm.

Particularly advantageous properties, in particular great toughness at low temperatures and simultaneously good thermoplastic processability, are obtained when graft products with selected particle sizes are combined, namely either I) graft products based on silicone rubber (A) having average particle diameters of from 0.25 to 0.50 μm with graft products based on EPDM rubber (B) having average particle diameters of from 0.25 to 0.40 μm or II) graft products based on silicone rubber (A) having average particle diameters of from 0.10 to 0.15 μm with graft products based on EPDM rubber (B) having average particle diameters of from 0.35 to 0.60 μm.

The moulding compounds according to the invention may be produced by mixing their components A) and B) together at elevated temperatures, in particular at 100° C. to 280° C., e.g. in kneaders or on rolling mills or in mixing screws. If A) and B) are obtained in the form of suspensions, solutions or emulsions, these may be mixed together and processed together.

Conventional additives such anti-oxidants, lubricants, flame-regardants, fillers, pigments or antistatic agents may be added to the moulding compounds in the usual quantities.

The mixtures according to the invention are age resistant thermoplastic moulding compounds which have great toughness at low temperatures and good processibility when worked up by extrusion, calendering and injection moulding.

They may be worked up into age resistant moulded articles but are also suitable for use as modifiers for other plastics, in particular for brittle vinyl monomer resins such as styrene/acrylonitrile copolymers (SAN resins), α-methylstyrene/acrylonitrile copolymers, polystyrene, polymethyl methacrylate and polyvinyl chloride.

They are generally used in quantities of from 5 to 80% by weight, preferably from 10 to 70% by weight, based on the whole modified product.

One particularly preferred mixture of this type consists of from 5 to 80% by weight, preferably from 10 to 70% by weight of the alloy according to the invention and from 95 to 20% by weight, preferably from 90 to 30% by weight, of a thermoplastic resin of from 5 to 40 parts by weight of acrylonitrile and from 95 to 60 parts by weight of styrene, α-methylstyrene, p-methylstyrene, methyl methacrylate or mixtures thereof.

These resins are known. They are frequently referred to as SAN resins. They may be combined with the mixture of graft polymers by adding them when the graft polymers are being mixed together. For this purpose, the resins must be present in the same physical form (solid, latex or solution) as the graft polymers. Solid resins may also be mixed with the completed mixture of graft polymers or successively with the two graft polymer components on internal mixers and extruders.

The term "particle size" always refers to the average particle diameter $d_{50}$ determined by means of the ultracentrifuge according to W. Scholtan et al, Kolloid-Z. u.Z. Polymere 250 (1972), 782–796.

EXAMPLES AND COMPARISON EXAMPLES

Polymers

A) Graft product based on a silicone rubber having an average particle diameter ($d_{50}$) of 135 nm.

The silicone rubber emulsion was prepared as follows: 38.4 Parts by weight of octamethylcyclotetrasiloxane, 1.2 parts by weight of tetramethyltetravinylcyclotetrasiloxane and 1 part by weight of γ-mercaptopropylmethyldimethoxysilane are stirred together. 1.00 Part by weight of dodecylbenzene sulphonic acid is added, followed, by 58.4 parts by weight of water within one hour and the mixture is vigorously stirred at the same time. The pre-emulsion is homogenized twice in a high pressure emulsifying machine at about 220 bar. A further 0.5 parts by weight of dodecylbenzene sulphonic acid is then added. The emulsion is stirred at 85° C. for two hours and then at room temperature for 36 hours. It is neutralised with 5N NaOH. A stable emulsion having a solids content of about 36% is obtained. The average particle diameter ($d_{50}$) is 135 nm. Grafting reaction: The following are introduced into a reactor:

2107 Parts by weight of the above described latex and
1073 parts by weight of water.

After the reaction has been initiated with a solution of 7.5 parts by weight of potassium peroxydisulphate in 195 parts by weight of water at 65° C., the following solutions are introduced at a uniform rate into the reactor within 4 hours:

Solution 1:
    540 parts by weight of styrene,
    210 parts by weight of acrylonitrile
Solution 2:
    375 parts by weight of water
    15 parts by weight of the sodium salt of $C_{14}$-$C_{18}$-alkylsulphonic acids.

Polymerisation is then carried to completion by heating at 65° C. for 4 hours. A latex having a solids content of about 33% by weight is obtained. The graft product is obtained in the form of a white powder after coagulation with an aqueous magnesium chloride/acetic acid solution, filtration and drying in a vacuum.

B) Graft product based on a silicone rubber having an average particle diameter ($d_{50}$) of 320 nm. This silicone rubber emulsion was prepared as described under (A) but with 0.90 parts by weight of dodecylbenzene sulphonic acid and under a pressure of about 190 bar at the stage of homogenisation. The grafting reaction was carried out as described under (A).

C) Graft product based on a core/sheath silicone rubber having an average particle diameter ($d_{50}$) of 325 nm.

C.1) Preparation of a silicone emulsion 38.4 Parts by weight of octamethylcyclotetrasiloxane, 1.2 parts by weight of tetramethyl tetravinyl cyclotetrasiloxane and 0.2 parts by weight of tetraethoxysilane are stirred together. 0.5 Parts by weight of dodecylbenzene sulphonic acid are added, followed by 70 parts by weight of water within one hour, and the mixture is vigorously stirred. The pre-emulsion is homogenized twice in a high pressure emulsifying machine at about 220 bar. A further 0.5 parts by weight of dodecylbenzene sulphonic acid is then added. The emulsion is stirred at 85° C. for 2 hours and then at room temperature for 36 hours. Neutralisation is carried out with 5N NaOH. A stable emulsion having a solids content of about 36% is obtained.

C.2) Silicone rubber covered with an acrylate rubber shell

The following are introduced into a reactor:

2500 parts by weight of the latex described in C.1) and 228 parts by weight of water.

A solution of 3 parts by weight of potassium peroxydisulphate in 100 parts by weight of water is introduced into the reactor at 70° C. The following solutions are then introduced into the reactor within 5 hours at 70° C.:

Solution 1:
  387 parts by weight of n-butylacrylate and
  1 part by weight of triallylcyanurate
Solution 2:
  500 parts by weight of water and
  10 parts by weight of the sodium salt of $C_{14}$-$C_{18}$-alkylsulphonic acids.

Polymerisation is then completed within 4 hours at 70° C. The resulting latex contains the polymer at a concentration of 35% by weight. The polymer consists of 70% by weight of silicone and 30% by weight of acrylate rubber.

C.3) Graft product

The following are introduced into a reactor:
3700 Parts by weight of the above described latex and 770 parts by weight of water.
After initiation by means of a solution of 3.5 parts by weight of potassium peroxydisulphate in 150 parts by weight of water at 70° C., the following solutions are introduced at a uniform rate into the reactor within 5 hours:

Solution 1:
  455 parts by weight of methyl methacrylate and
  400 parts by weight of styrene
Solution 2:
  1000 parts by weight of water and
  30 parts by weight of the sodium salt of $C_{14}$-$C_{18}$-alkylsulphonic acids.

Polymerisation is then completed over a period of 4 hours at 70° to 75° C. A latex having a solids content of about 33% by weight results.

D) Graft product based on a EPDM rubber (average particle diameter ($d_{50}$) about 300 nm):
  Koblend W 4 of Montedipe, rubber content about 33%.

E) Graft product based on a EPDM rubber (average particle diameter ($d_{50}$) about 550 nm):
  Unibrite UB 400 of Sumitomo.

F) Styrene/acrylonitrile copolymer (weight ratio 72:28) having a weight average molecular weight $\overline{M}w$ of about 115,000 and a heterogeneity index $U = \overline{M}w/\overline{M}n - 1$ of $\leq 2.0$.

G) α-Methylstyrene/acrylonitrile=72:28 copolymer having a weight average molecular weight $\overline{M}w$ of about 75000 and a $\overline{M}w/\overline{M}n - 1$ of $\leq 2.0$.

The amounts by weight of components A to G shown in Table 1 were mixed with 2 parts by weight of pentaerythritol tetrastearate and 0.1 part by weight of silicone oil at about 200° C. in an internal kneader and the resulting mixture was granulated and worked up at 240° C. by injection moulding (75 seconds cycle).

The impact strength at −40° C. and the notched impact strength (room temperature and −40° C.) were measured according to DIN 53 453 (unit: $kJ/m^2$) and the dimensional stability under heat (Vicat B) was determined according to DIN 53 460 (unit: °C.). The fluidity was assessed by measuring the MVI value according to DIN 53 735 U (unit: $cm^3/10$ min).

The test data of the moulding compounds are summarized in Table 2.

TABLE 1

| | Compositions of the moulding compounds | | | | | | |
|---|---|---|---|---|---|---|---|
| Moulding compound | A Parts by wt. | B Parts by wt. | C Parts by wt. | D Parts by wt. | E Parts by wt. | F Parts by wt. | G Parts by wt. |
| 1 | 22.5 | — | — | 34 | — | 43.5 | — |
| 2 | — | 22.5 | — | 34 | — | 43.5 | — |
| 3 | 22.5 | — | — | — | 34 | 43.5 | — |
| 4 | — | — | 22.5 | 34 | — | 43.5 | — |
| 5 | — | 20 | — | 30.5 | — | — | 49.5 |
| 6 | — | — | 20 | — | 30.5 | — | 49.5 |
| 7 (Comparison) | — | 45 | — | — | — | 55 | — |
| 8 (Comparison) | — | — | — | 68 | — | 32 | — |
| 9 (Comparison) | — | 40 | — | — | — | — | 60 |
| 10 (Comparison) | — | — | — | 61 | — | — | 39 |

TABLE 2

| | Physical data of moulding compound | | | | |
|---|---|---|---|---|---|
| Moulding compound | 20° C. ak | −40° C. ak | −40° C. an | Vicat B | MVI |
| 1 | 18.2 | 7.1 | 74.2 | 95 | 5.1 |
| 2 | 20.3 | 8.7 | 73.4 | 94 | 7.4 |
| 3 | 19.6 | 8.8 | 78.2 | 94 | 7.5 |
| 4 | 21.4 | 7.0 | 63.6 | 93 | 8.2 |
| 5 | 15.3 | 5.0 | 100.4 | 101 | 1.8 |
| 6 | 15.4 | 4.8 | 50.8 | 102 | 2.5 |
| 7 (Comparison) | 15.4 | 10.6 | 96.5 | 96 | 2.2 |
| 8 (Comparison) | 20.5 | 3.5 | 69.8 | 92 | 10.2 |

TABLE 2-continued

| Moulding compound | Physical data of moulding compound | | | | |
|---|---|---|---|---|---|
| | 20° C. $a_k$ | −40° C. $a_k$ | −40° C. $a_n$ | Vicat B | MVI |
| 9 (Comparison) | 13.8 | 5.0 | 75.1 | 105 | 0.6 |
| 10 (Comparison) | 15.2 | 3.9 | 70.4 | 96 | 1.5 |

$a_k$ = notched impact strength
$a_n$ = impact strength

We claim:

1. Molding compositions of
  A) 5 to 95% by weight based on the weight of the composition of a graft product of a mixture of 50 to 100 parts by weight styrene, α-methyl styrene, vinyl toluene, methyl methacrylate or mixtures thereof and 0 to 50 parts by weight acrylonitrile on a particulate silicone rubber having an average particle diameter ($d_{50}$) of from 0.10 to 0.50 μm with a total rubber content of from 30 to 90% by weight based on the weight of the graft product and
  B) 95 to 5% by weight based on the weight of the composition of a graft product of a mixture of 50 to 100 parts by weight styrene, α-methyl styrene, vinyl toluene, methyl methacrylate or mixtures thereof and from 0 to 50 parts by weight acrylonitrile on a particulate EPDM rubber having an average particle diameter ($d_{50}$) of from 0.20 to 1.00 μm with a total rubber content of from 10 to 50% by weight based on the weight of the graft product.

2. Molding compositions of
  A) 20 to 80% by weight based on the weight of the composition of a graft product of a mixture of mixture of 60 to 95 parts by weight styrene, α-methyl styrene, vinyl toluene, methyl methacrylate or mixtures thereof and 5 to 40 parts by weight acrylonitrile on a particulate silicone rubber having an average particle diameter ($d_{50}$) of from 0.10 to 0.15 μm or from 0.25 to 0.50 μm with a total rubber content of from 40 to 80% by weight based on the weight of the graft product and
  B) 80 to 20% by weight of a graft product of a mixture of 60 to 95 parts by weight styrene, α-methyl styrene, vinyl toluene, methyl methacrylate or mixtures thereof and 5 to 40 parts by weight acrylonitrile on a particulate EPDM rubber having an average particle diameter ($d_{50}$) of from 0.25 to 0.40 μm or from 0.35 to 0.60 μm with a total rubber content of from 10 to 40% by weight based on the weight of the graft product.

3. Molding compositions comprising from 5 to 80% by weight of the molding composition claimed in claim 1 and from 95 to 20% by weight of a thermoplastic resin of 5 to 40 parts by weight acrylonitrile and 95 to 60 parts by weight styrene, α-methyl styrene, p-methyl styrene, methyl methacrylate or mixtures thereof wherein the % by weight is based on the total weight of the molding composition of claim 1 and the thermoplastic resin.

* * * * *